United States Patent
Zhang et al.

(10) Patent No.: US 12,360,681 B2
(45) Date of Patent: Jul. 15, 2025

(54) DATA RECOVERY WITH ENHANCED SUPER CHIP-KILL RECOVERY AND METHOD OF OPERATING SUCH MEMORY SYSTEM

(71) Applicant: SK hynix Inc., Gyeonggi-do (KR)

(72) Inventors: Fan Zhang, San Jose, CA (US); Meysam Asadi, San Jose, CA (US); Ahmad Golmohammadi, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 61 days.

(21) Appl. No.: 18/175,784

(22) Filed: Feb. 28, 2023

(65) Prior Publication Data
US 2024/0289028 A1   Aug. 29, 2024

(51) Int. Cl.
*G06F 3/06* (2006.01)
*G06F 11/10* (2006.01)

(52) U.S. Cl.
CPC ............ *G06F 3/0619* (2013.01); *G06F 3/064* (2013.01); *G06F 3/0679* (2013.01); *G06F 11/1012* (2013.01); *G06F 11/1068* (2013.01)

(58) Field of Classification Search
CPC ...... G06F 3/0619; G06F 3/064; G06F 3/0679; G06F 11/1012; G06F 11/1068
See application file for complete search history.

(56) References Cited

U.S. PATENT DOCUMENTS

| | | | |
|---|---|---|---|
| 2002/0029362 A1* | 3/2002 | Stephen | H03M 13/2746 714/752 |
| 2011/0199246 A1* | 8/2011 | Kinyua | H03M 3/50 341/143 |
| 2011/0214039 A1* | 9/2011 | Steiner | G06F 11/1012 714/E11.032 |
| 2014/0032997 A1* | 1/2014 | Cheng | H03M 13/2739 714/781 |
| 2014/0325318 A1 | 10/2014 | Marrow et al. | |
| 2016/0092300 A1* | 3/2016 | Lei | G06F 11/1068 714/764 |
| 2017/0019213 A1* | 1/2017 | Ku | H03M 13/658 |
| 2017/0294923 A1* | 10/2017 | Bhatia | G06F 11/1076 |
| 2018/0074893 A1* | 3/2018 | Vaidhyanathan | G06F 3/0619 |
| 2018/0269904 A1* | 9/2018 | Khayat | H03M 13/2918 |
| 2020/0057693 A1* | 2/2020 | Kim | G11C 29/52 |
| 2022/0129180 A1 | 4/2022 | Kim et al. | |

* cited by examiner

*Primary Examiner* — Nanci N Wong
(74) *Attorney, Agent, or Firm* — IP & T GROUP LLP

(57) ABSTRACT

A memory system having a memory block and a memory controller in communication with the memory block. The memory controller is configured to: decode codewords in the memory block; determine failed codewords based on one or more parity checks including a chipkill parity; and turbo-decode the failed codewords using at least two decoders in a feedback loop with adders prior to each decoder for scaling soft decode information prior to subsequent decoding of the failed codewords.

20 Claims, 7 Drawing Sheets

DATA RECOVERY WITH ENHANCED SUPER CHIP-KILL RECOVERY AND METHOD OF OPERATING SUCH MEMORY SYSTEM

BACKGROUND

1. Field

Embodiments of the present disclosure relate to a memory system with a scheme to generate chip-kill parity, and method of operating such memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes the electronics that bridge the flash memory components to the SSD input/output (I/O) interfaces. The SSD controller may include an embedded processor that executes functional components such as firmware. The SSD functional components are typically device specific, and in most cases, can be updated.

The two main types of flash memories are named after the NAND and NOR logic gates. The individual flash memory cells exhibit internal characteristics similar to those of their corresponding gates. The NAND-type flash memory may be written to and read from in blocks (or pages) which are generally much smaller than the entire memory space. The NOR-type flash allows a single machine word (byte) to be written to an erased location or read independently. The NAND-type flash memory operates primarily in memory cards, USB flash drives, solid-state drives (SSDs), and similar products, for general storage and transfer of data.

A flash memory, e.g., of the NAND-type, may apply any of various error correction codes to correct errors in data. One such error correction code is low-density parity-check code (LDPC), which is an advanced error code that is used to recover a relatively large number of errors in data. In this context embodiments of the present invention arise.

SUMMARY

In one embodiment of the present invention, there is provided a memory system having a memory block and a memory controller in communication with the memory block. The memory controller is configured to: decode codewords in the memory block; determine failed codewords based on one or more parity checks including a chipkill parity; and turbo-decode the failed codewords using at least two decoders in a feedback loop with adders prior to each decoder for scaling soft decode information prior to subsequent decoding of the failed codewords.

In one embodiment of the present invention, there is provided a method for recovery for bitline errors, comprising: decoding codewords in a memory block; determining failed codewords based on one or more parity checks including a chipkill parity; and turbo-decoding the failed codewords using at least two decoders in a feedback loop with adders prior to each decoder for scaling soft decode information prior to subsequent decoding of the failed codewords.

Additional aspects of the present invention will become apparent from the following description.

DETAILED DESCRIPTION

Figure 1:
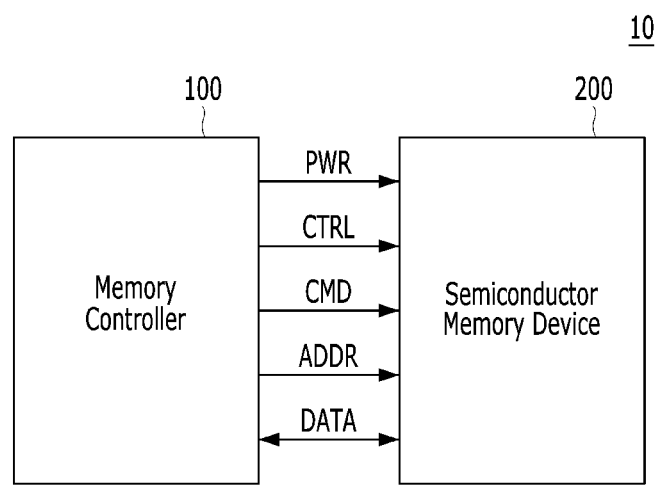
FIG. 1 is a block diagram illustrating a memory system in accordance with one embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this conveys the scope of the present invention to those skilled in the art. Moreover, reference herein to "an embodiment," "another embodiment," or the like is not necessarily to only one embodiment, and different references to any such phrases are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The invention encompasses numerous alternatives, modifications and equivalents to the disclosed embodiments. Numerous specific details are set forth in the following description in order to provide a thorough understanding of the invention. These details are provided for the purpose of example; the invention may be practiced without some or all of these specific details. For clarity, technical material that is known in technical fields related to the invention has not been described in detail so that the invention is not unnecessarily obscured.

FIG. 1 is a block diagram schematically illustrating a memory system in accordance with one embodiment of the present invention.

Referring FIG. 1, the memory system 10 may include a memory controller 100 and a semiconductor memory device 200, which may represent more than one such device. The semiconductor memory device(s) 200 may be flash memory device(s), particularly of the NAND-type.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as for example a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
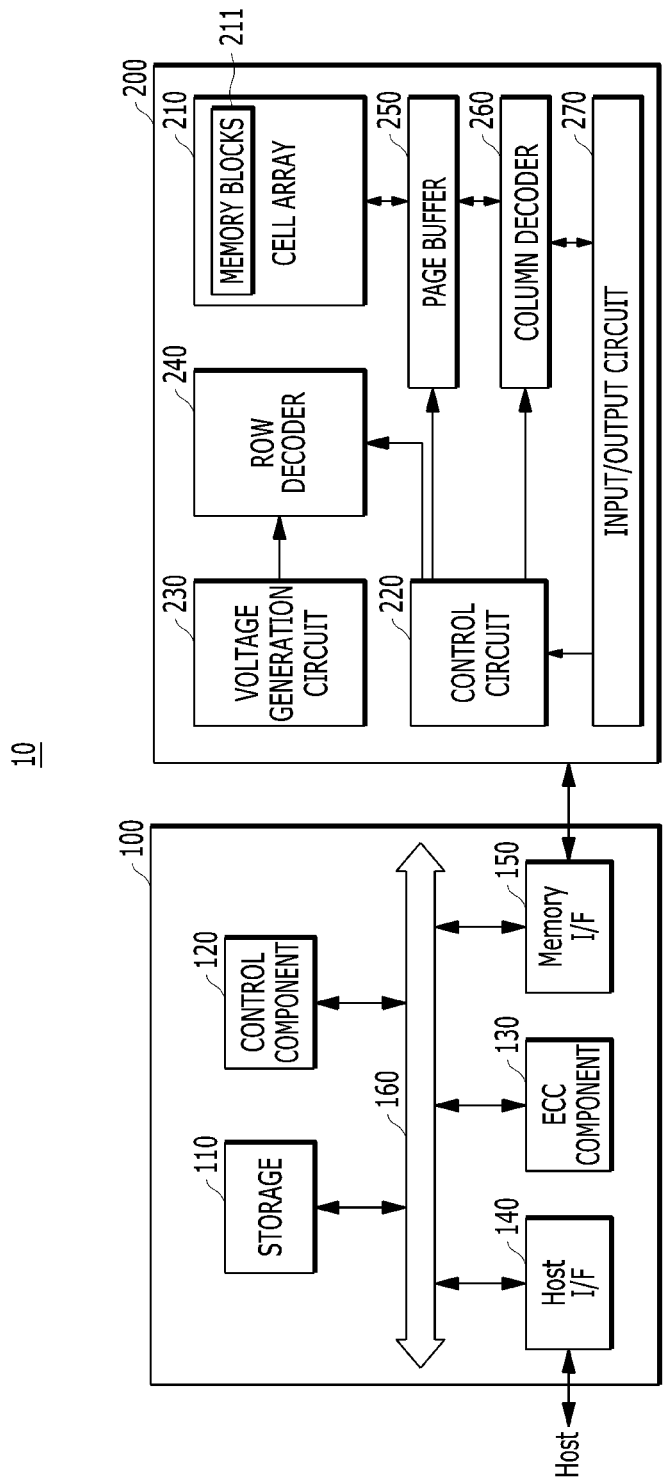
FIG. 2 is a block diagram illustrating a memory system in accordance with another embodiment of the present invention.

FIG. 2 is a detailed block diagram illustrating a memory system in accordance with another embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as for example a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as for example a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as for example a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and write and read operations for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In some embodiments, the ECC component 130 may perform an error correction operation based on coded modulation techniques such as for example a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM). As such, the ECC component 130 may include circuits, systems or devices for suitable error correction operation. In particular, the ECC component 130 may include an encoder and an LDPC decoder, e.g., a single LDPC chip-kill decoder.

Chipkill is a form of advanced error checking and correcting that protects computer memory systems from any single memory chip failure as well as multi-bit errors from any portion of a single memory chip. Causes of a failure may be due to defects during the manufacturing process, mechanical stress to the device prior to or during use, degradation of the dielectric material in memory cells, among others. Failures may occur at the memory cell level, which may propagate and cause failures within other components of non-volatile memory. Prior chipkill schemes have computed parities (using the XOR operation) based on memory cells from the same bitline, which results in it being more difficult to recover from a bitline failure, which is most commonly observed in NAND flash memory. Prior chipkill schemes have scattered bits of a Hamming code ECC word across multiple memory chips, such that the failure of any single memory chip will affect only one ECC bit per word. This allows memory contents to be reconstructed despite the complete failure of one chip. For example, soft chipkill recovery can be advantageously used if one or more components of non-volatile memory fails prior to or during operation of non-volatile memory system.

The host interface 140 may communicate with the host device through one or more of various interface protocols such as for example a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as erase and pass voltages.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
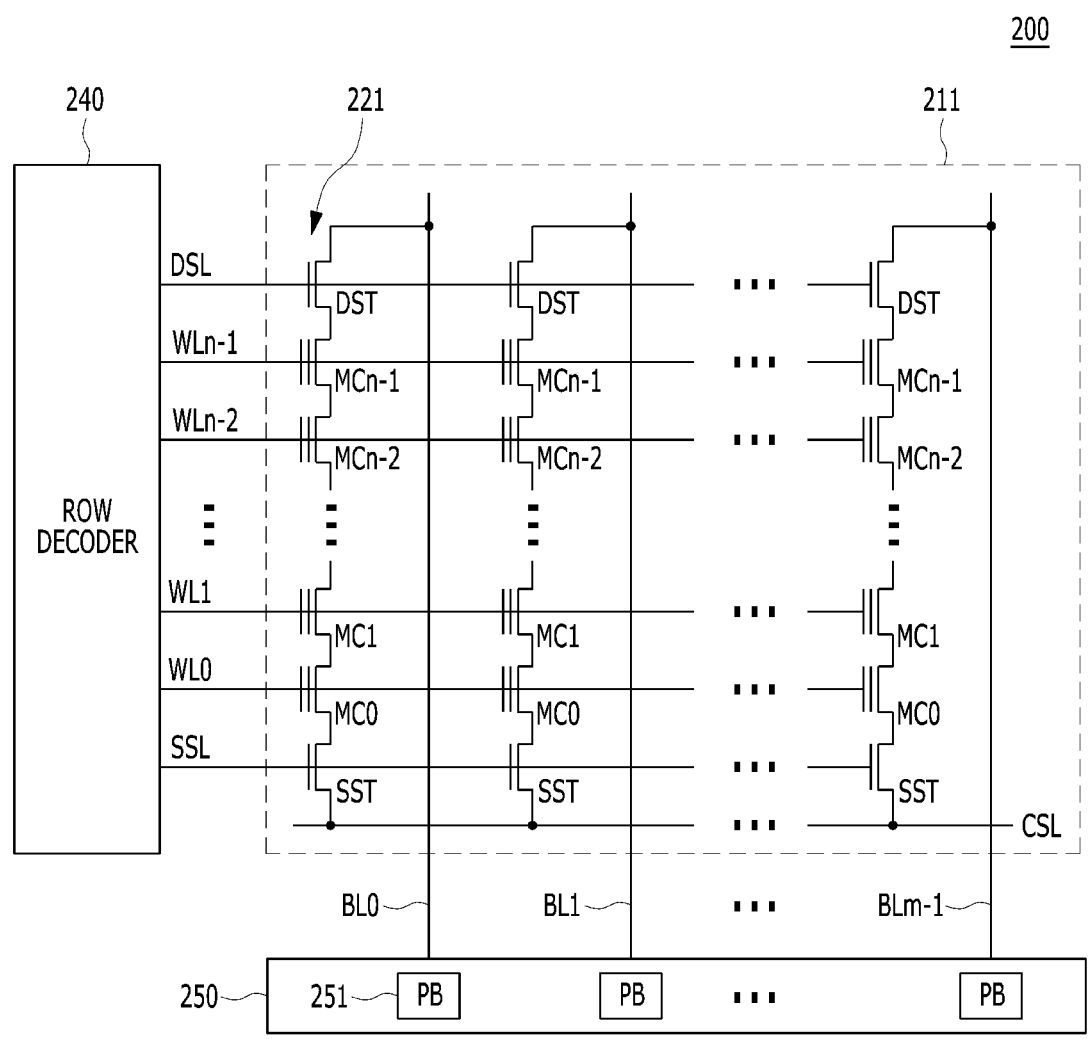
FIG. 3 is a circuit diagram illustrating a memory block of a memory device of a memory system in accordance with still another embodiment of the present invention.

The page buffer 250 may be in electrical communication with the memory cell array 210 through bit lines BL (shown in FIG. 3). The page buffer 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with another embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer 250 may include a plurality of separate page buffers PB 251 that are coupled to the bit lines BL0 to BLm−1. The page buffers PB 251 may operate in response to page buffer control signals. For example, the page buffers PB 251 my temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
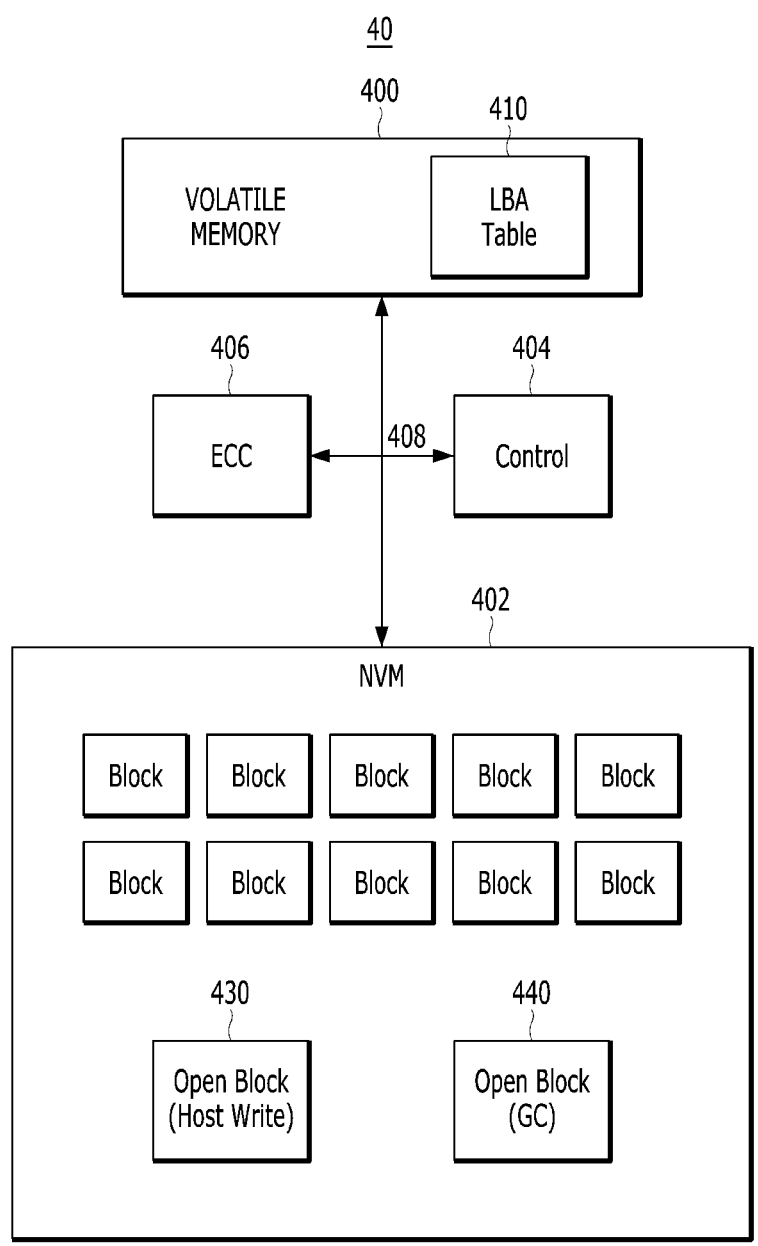
FIG. 4 is a schematic diagram of a memory system in accordance with yet another embodiment of the present invention.

Referring to FIG. 4, a general example of a memory system 40 is schematically illustrated. The memory system 40 may include a volatile memory 400 (e.g., a DRAM), a non-volatile memory (NVM) 402 (e.g., NAND), a control component or control logic 404, such as described herein, an error correcting code (ECC) module 406, such as described herein, and a bus 408 through which these components of the memory system 40 communicate. The volatile memory 400 may include a logical bit address LBA table 410 for mapping physical-to-logical addresses of bits. The NVM 402 may include a plurality of memory blocks (and/or a plurality of super memory blocks), as well as an open block for host writes 430 and an open block for garbage collection (GC) 440. Multiple memory blocks may be grouped together as a superblock for certain functional purposes. While FIG. 4 shows a general memory system, additional/alternative components that may be utilized with memory systems to effectuate the present invention will be understood to those of skill in the art in light of this disclosure.

Conventional Chipkill Recovery

Figure 5A:
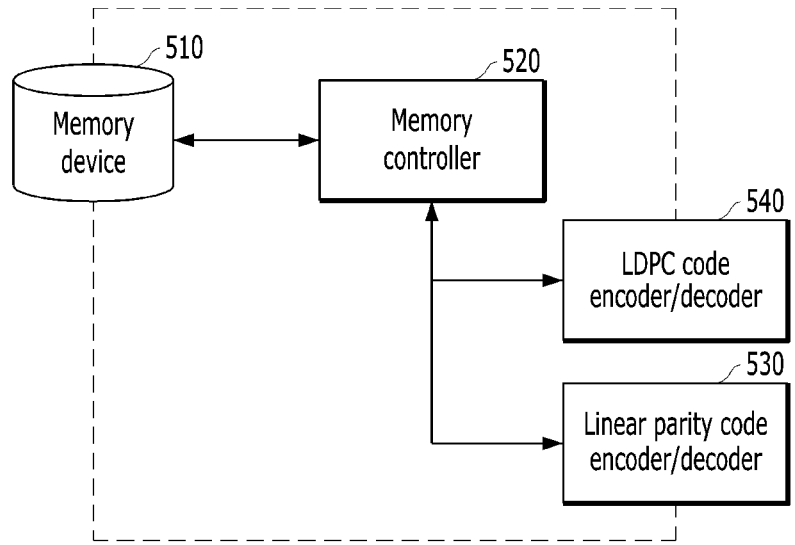
FIG. 5A is a schematic diagram of a memory system having memory controller using a low density parity check (LDPC) code encoder/decoder in accordance with yet another embodiment of the present invention.

FIG. 5A is a block diagram illustrating an exemplary storage system for soft chipkill recovery of bitline failures. As illustrated in FIG. 5A, data is stored on a memory device 510 (e.g., NAND Flash). A memory controller 520 is used to access the data stored on the memory device 510 and interface with two types of error correcting codes that are typically used to ensure the reliability of memory-low-density parity check (LDPC) codes and linear binary codes with parity checks. As illustrated in FIG. 5A, both the LDPC code module 540 and the linear parity code module 530 interface with both the memory controller 520 and the memory device 510. Typically, the LDPC code and linear parity code modules (540 and 530, respectively) include both encoding and decoding functionality, and may support a variety of codeword sizes and code rates. In some embodiments, some or all of the modules in FIG. 5A are implemented using semiconductor components, such as an application-specific integrated circuit (ASIC) or a field-programmable gate array (FPGA).

In one example of chipkill recovery, all wordlines in a block are read and decoded through the LDPC decoder. Successfully decoded wordlines data can be used to find bitline error locations based on the intersection of all errors across successfully decoded data. For example, locations where bits are always in error may be identified as potential candidates having experienced a bitline failure. This method leverages the fact that errors are randomly distributed, and therefore, the probability that errors lie on same location in a block is quite low.

Figure 5B:
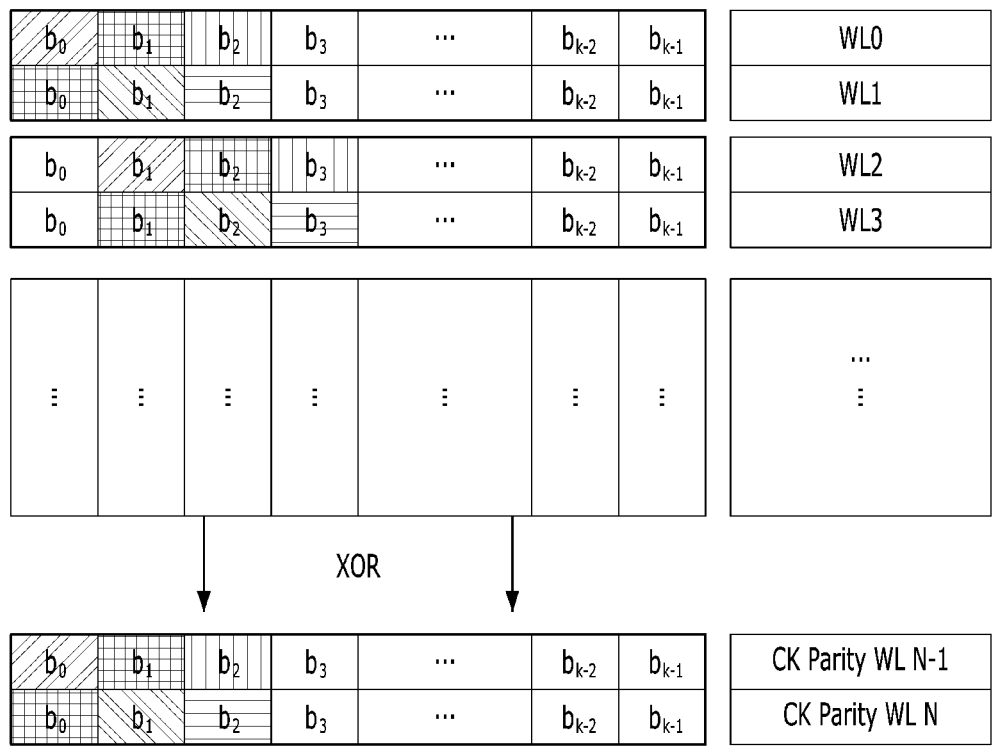
FIG. 5B is a schematic illustrating a particular example of generating chipkill parity in accordance with one embodiment of the present invention.

FIG. 5B illustrates a particular example of generating chipkill parity. As illustrated therein, each wordline (indicated as WL 0, WL 1, WL2, . . . in FIG. 5B) includes memory cells whose contents have been encoded using the LDPC code. The parity bits of the parity codeword are generated based on exclusive OR (XOR) operations over data bits that are distributed across different word lines, as illustrated by the differently shaded bits in FIG. 5B. For example, a first parity bit may be generated based on bit b0 in WL 0, bit b1 in WL 2, and so on (a diagonal distribution), and a second parity bit based on bit b0 in WL 1, bit b1 in WL 3, and so on (another diagonal distribution). As shown in FIG. 5, for every N WLs (WL0 to WL_N−1), the CK parity is the XOR of all these WLs which is stored in WL_N. That is for each N bits of data on the same bitline, one additional bit (their XOR) is stored as CK parity. The chipkill parities can be appended as an "outer parity" to the codeword. In the extreme case, failure with all the decoding attempts such as (hard decoding, soft decoding, . . . ), there is still chance of recovering each bit using CK method (with the help of CK parity).

A conventional iterative MP decoder alternates between two phases, a variable node (VN) to check node (CN) "VN-to-CN" phase during which VN's send messages to CN's along their adjacent edges, and a "CN-to-VN" phase during which CN's send messages to their adjacent VN's. In the initialization step of the decoding process, one VN forwards the same message to all of its neighboring CNs, namely a log-likehood ratio (LLR) derived from the corresponding channel output. In the CN-to-VN message update phase, a CN uses the incoming messages and a CN update rule to compute and forward, to a VN a new "CN-to-VN" message, where the VN processes its incoming messages according to the update rule and forwards to each adjacent CN an updated "VN-to-CN" message.

Figure 6:
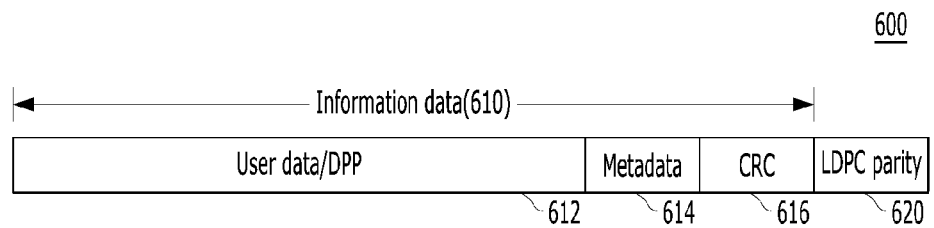
FIG. 6 is a schematic illustrating a codeword stored in a memory block containing user data and parity information in accordance with another embodiment of the present invention.

FIG. 6 is a diagram illustrating a format of a codeword 600 to be stored in a storage system. Referring to FIG. 6, the codeword 600 of the present invention may include information data 610 and parity data 620. In some embodiments, the codeword 600 may be generated based on the coded modulation techniques described above such the low-density parity-check (LDPC) codes. In other words, the information data 610 may be protected by LDPC codes, and the parity 620 may be a LDPC parity as shown in FIG. 6. The information data 610 may include user data with data path protection (DPP) 612, meta-data 614, and cyclic redundancy check (CRC) parity bits 616. A CRC code which is an error-detecting code commonly used in digital networks and storage devices may detect accidental changes to raw data.

SUPER ChipKill, SCK, stands for Soft Uncorrectable Page Error Recovery, is a data recovery feature for XOR or chipkill. In the write-path, n−1 data codewords are XORed into a parity codeword. In the read-path, if there is only one codeword failure with soft decoding, the remaining codewords on the same memory stripe will be read and XORed to recover the failed codeword. If there are more than one failed codeword on the memory stripe, SCK allows recovery of a codeword which failed its soft decode even when there are k>2 codewords (including itself) failing the soft decode on the same memory stripe.

Constructing such codes may be performed by an encoder in the ECC component 130 of FIG. 2 or the ECC module 406 of FIG. 4. The decoding in the super-kill chip recovery decoding scheme may be performed by an LDPC decoder, which may be embodied in the ECC component/module 130 or 406 or 530/540.

Inventive Error Recovery with Chip-Kill Parity

Aspects of the present invention are directed to an error recovery scheme involving improved chip-kill parity. A modified MS decoder is utilized to improve correction performance beyond simply using LDPC matrices with irregular row weights. In particular, the modified MS decoder of the present invention can improve error correction performance during burst errors where an error that causes the corruption of several in a series of consecutive bits in a memory word occurs.

With regard to the utility of the present invention, a penta-level cell PLC NAND can store 5 bits per cell so that the cost is reduced by 20% from a quad-level cell QLC NAND. The present invention arises in the context of realizing that the challenge in using PLC in an SSD is that the raw bit error rate in a PLC NAND is quite high. In particular, a typical 16 KB ECC engine does not have enough correction capability to meet the PLC reliability target. To meet the reliability requirement, spare bytes may be added to the PLC NAND or an additional parity for error correction may be added to the user data (for example to user data 612 shown in FIG. 6). Both of these methods come with a cost in NAND and/or user capacity. In the present invention, chipkill parity is used to boost the correction capability for a PLC NAND. With this scheme, there is no additional cost in NAND or user capacity as chipkill parity is already included in most of SSDs today to deal with media defects such as die/block/WL failure.

The classical chipkill, or XOR scheme (implemented in most of the SSDs today) XORs some sectors of the read memory data into a parity sector (such as shown in FIG. 5B. In the case that a sector fails the soft read/decode (e.g., one sector is lost due to media defects), data can be recovered by reading/XORing the remaining sectors on the same memory stripe. If there is another sector or multiple sectors that fail the soft read/decode during the chipkill recovery process, i.e., reading/XORing the rest sectors on the same memory stripe, the data will be considered lost and an uncorrectable error correction code UECC event will be reported to the host.

In one embodiment of the present invention, SCK (detailed above) uses a parity codeword as an outer code (a single parity check SPC) and applies soft decoding (for example through exchange of C2V messages containing log likelihood ratios LLR) across (or between) the failed codewords over a non-zero coset, which is equal to the XOR of all successfully decoded codewords on the same memory stripe.

Dynamic Scaling

In one embodiment of the present invention, the channel output signal and the estimated value for the channel output signal (the XORed signal) obtained from the remaining (non-failure) codewords on the same memory stripe can be scaled differently depending on the number of failures on the memory stripe being corrected. For example, the following sum product algorithm (SPA) rule can be applied to initialize the decoder input, for a bit j:

$$\tilde{y}_{0,j}^{SPA} = \alpha_1 \sigma^2 a\tanh\left(\prod_{i=1}^{k} \tanh\left(\frac{y_{i,j}}{\sigma^2}\right)\right) y_{k+1,j} + \alpha_2 y_{0,j}, \quad \text{Eq. (1)}$$

where a1 and a2 are scaling factors which are optimized per value of k and where j" shows j-th bit of the page. K is the number of acceptable codeword failure in the stripe. One option for a1, a2 would be a1=1/k, a2=(k−1)/k.

As detailed below, in one embodiment of the present invention, the scaling factors are used to scale the log likelihood ratio values for soft decoding.

Turbo Decoding for Chipkill

Another inventive concept of the present invention is to use turbo decoding (e.g., with plural decoders) such that the failed codewords can/may share useful information (e.g., via soft decoding with LLR communications) with each other during the decoding process with the decoding operation being done in iterations. For example, a soft decoder in the ECC component 130 of FIG. 2 or the ECC module 406 of FIG. 4 may output a log-likelihood ratio (LLR) where the sign indicates the decision (e.g., a positive value corresponds to a "1" decision and a negative value corresponds to a "0" decision) and the magnitude indicates how sure or certain the decoder is in that decision (e.g., a large magnitude indicates a high reliability or certainty).

Figure 7:
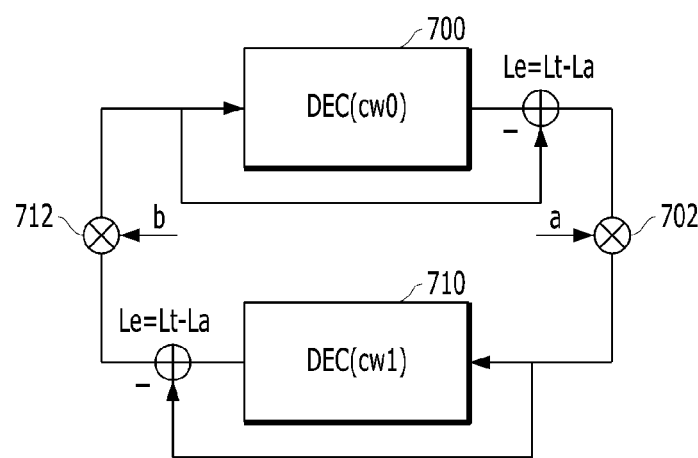
FIG. 7 is a schematic showing the turbo decoding of failed codewords in accordance with still another embodiment of the present invention.

An example of turbo decoding between 2 codewords (cw0 and cw1) is shown in FIG. 7. As shown in FIG. 7, there are two decoders 700 and 710 having respective adders 702 and 712. Decoder 700 decodes one codeword cw0. Decoder 710 decodes another codeword cw1. The a priori LLR (La) is subtracted from the total LLR (Lt) at the output of decoder 700 and becomes the extrinsic LLR (Le). At adder 702, Le is then scaled by one or more of the scaling factors obtained from Eq. 1 before passing to decoder 710 for processing the next failed codeword cw1. The output of decoder 710 can be also scaled by adder 712 before being fed back to decoder 700, should it be necessary to iterate the error correction for codeword cw0. In the turbo decoding of FIG. 7, a and b can be selected during simulation, with one option for these two parameters being a=b=0.5. Assume the codeword length is 4, and the input sequence is [1, 0, 0, 1] with LLR input values [−7, 3, 4, −2] and CS_in=10. Assume the decoder output is [1, 1, 0, 0] with CS_out=5. Because the CS_out<CS_in, the decoder output can be used to change the sign of the input LLRs. The new input LLRs have the same magnitude [−7, −3, 4, 2], with the sign obtained from the decoder output (for bit 1, the sign of LLR is −1, and for bit 0 the sign of LLR is 1).

Use of Decoder Output Raw Bit Error Rate RBER

When a codeword fails to decode, based on the checksum at decoder input and output, a determination can be made if the number of errors (e.g., RBER) is reduced (even not to zero) in the decoding. If the checksum is lower than a predefined threshold, which depends on the parity check matrix of the code, the magnitude from decoder input and the sign from decoder output can be used to initialize the decoder input of the intended codeword, as the errors in the sign bits at decoder output is typically lower than the errors in the decoder input.

Figure 8:
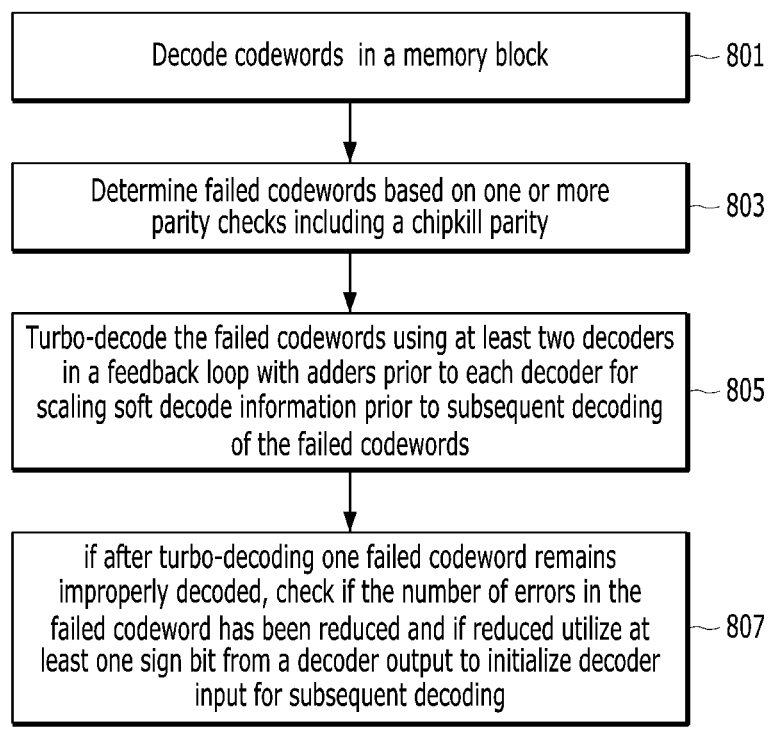
FIG. 8 is a flow chart of a method for recovery for bitline errors in accordance with one embodiment of the present invention.

FIG. 8 illustrates a flowchart for an exemplary method for recovery for bitline errors. In this example, it is assumed that a memory block comprises n codewords (such as codeword 600 in FIG. 6), that a chipkill parity is calculated based on bit values distributed across different columns and rows of the memory block, and that there are number of codewords that cannot be corrected for example by the LDPC encoder/decoder 540 in FIG. 5A. Such failures may be due to one or more bad word lines.

The method illustrated in FIG. 8 begins at 801 when (all) the codewords in a memory block are decoded. At 803, failed codewords (i.e., those not correctly decoded) are determined based on one or more parity checks including the chipkill parity. At 805, the failed codewords are turbo-decoded using at least two decoders in a feedback loop with adders prior to each decoder for scaling soft decode information prior to subsequent decoding of the codewords. At 807, if one failed codeword remains improperly decoded after turbo-decoding, check if the number of errors in the failed codeword has been reduced and if reduced utilize at least one sign bit from a decoder output to initialize decoder input for subsequent decoding.

In this method, if after turbo-decoding one failed codeword remains improperly decoded, the number of errors in the failed codeword may be checked to see if the number was reduced. When the number of errors in the failed codeword has been reduced, sign bits from a decoder output may be utilized to initialize decoder input for subsequent decoding of the failed codeword.

In this method, the chipkill parity may comprise an outer parity in the codewords (such as shown in FIG. 6). The chipkill parity may be calculated based on bit values distributed across different columns and rows of the memory block (such as for example bit values distributed diagonally across different columns and rows of the memory block). In one embodiment of the present invention, the chipkill parity is equal to an XOR operation on successfully decoded codewords in the memory block.

In this method, the soft decode information may comprise log likelihood ratios estimating corrections for the failed codewords. The soft decode information may comprise scaling factors applied to the log likelihood ratios by the adders. The scaling factors vary depending on a number of failures detected in a failed codeword being corrected (such as in Eq. 1).

In this method, a low density parity matrix encoder and a low density parity matrix decoder may be utilized for encoding and decoding user data respectively stored or retrieved from the memory block.

In another embodiment of the present invention, there is provided a memory system having a memory block, and a memory controller in communication with the memory block, wherein the memory controller is configured to: decode codewords in the memory block; determine failed codewords based on one or more parity checks including a chipkill parity; and turbo-decode the failed codewords using at least two decoders in a feedback loop with adders prior to each decoder for scaling soft decode information prior to subsequent decoding of the failed codewords.

In this system, the memory controller may be further configured to determine, if after turbo-decoding one failed codeword remains improperly decoded, check if the number of errors in the failed codeword has been reduced. The memory controller may be further configured to, if the number of errors in the failed codeword has been reduced, utilize at least one sign bit from a decoder output to initialize decoder input for subsequent decoding of the failed codeword.

In this system, the chipkill parity may comprise an outer parity in the codewords. The chipkill parity may be calculated based on bit values distributed across different columns and rows of the memory block. The chipkill parity may equal to an XOR operation on successfully decoded codewords in the memory block.

In this system, the soft decode information may comprise log likelihood ratios estimating corrections for the failed codewords. The soft decode information may comprise scaling factors applied to the log likelihood ratios by the adders. The scaling factors may vary depending on a number of failures detected in a failed codeword being corrected (such as in Eq. 1).

In this system, the memory controller may comprise a low density parity matrix encoder and a low density parity matrix decoder for encoding and decoding user data respectively stored or retrieved from the memory block.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "system" or "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

What is claimed is:

1. A method for recovery for bitline errors, comprising:
decoding codewords in a memory block;
determining failed codewords based on one or more parity checks including a chipkill parity; and
turbo-decoding the failed codewords using at least two decoders in a feedback loop with adders prior to each decoder for scaling soft decode information before subsequent decoding of the failed codewords,
wherein first soft decode information for a first failed codeword read from the memory block is scaled and applied as second soft decode information to a second failed codeword read from the memory block during the subsequent decoding in the feedback loop of both the first failed codeword read from the memory block and the second failed codeword comprising another failed codeword read from the memory block.

2. The method of claim 1, further comprising:
determining, if after turbo-decoding, one failed codeword remains improperly decoded, check if the number of errors in the failed codeword has been reduced.

3. The method of claim 2, further comprising:
when the number of errors in the failed codeword has been reduced, utilizing at least one sign bit from a decoder output to initialize decoder input for subsequent decoding of the failed codeword.

4. The method of claim 1, wherein the chipkill parity comprises an outer parity in the codewords.

5. The method of claim 4, wherein the chipkill parity is calculated based on bit values distributed across different columns and rows of the memory block.

6. The method of claim 5, wherein the chipkill parity is equal to an XOR operation on successfully decoded codewords in the memory block, and
wherein an estimated value for scaling the first soft decode information is obtained from the successfully decoded codewords read from a same memory stripe.

7. The method of claim 1, wherein the soft decode information comprises log likelihood ratios estimating corrections for the failed codewords.

8. The method of claim 7, wherein the soft decode information comprises scaling factors applied to the log likelihood ratios by the adders.

9. The method of claim 8, wherein the scaling factors vary depending on a number of failures detected in a failed codeword being corrected.

10. The method of claim 1, further comprising:
utilizing a low density parity matrix encoder and a low density parity matrix decoder for encoding and decoding user data respectively stored or retrieved from the memory block.

11. A memory system comprising:
a memory block; and
a memory controller in communication with the memory block, wherein the memory controller is configured to:
decode codewords in the memory block;
determine failed codewords based on one or more parity checks including a chipkill parity; and
turbo-decode the failed codewords using at least two decoders in a feedback loop with adders prior to each decoder for scaling soft decode information before subsequent decoding of the failed codewords,
wherein first soft decode information for a first failed codeword read from the memory block is scaled and applied as second soft decode information to a second failed codeword read from the memory block during the subsequent decoding in the feedback loop of both the first failed codeword read from the memory block and the second failed codeword comprising another failed codeword read from the memory block.

12. The memory system of claim 11, wherein the memory controller is further configured to determine, if after turbo-decoding, one failed codeword remains improperly decoded, check if the number of errors in the failed codeword has been reduced.

13. The memory system of claim 12, wherein the memory controller is further configured to, if the number of errors in the failed codeword has been reduced, utilize at least one sign bit from a decoder output to initialize decoder input for subsequent decoding of the failed codeword.

14. The memory system of claim 11, wherein the chipkill parity comprises an outer parity in the codewords.

15. The memory system of claim 14, wherein the chipkill parity is calculated based on bit values distributed across different columns and rows of the memory block.

16. The memory system of claim 15, wherein the chipkill parity is equal to an XOR operation on successfully decoded codewords in the memory block, and
wherein an estimated value for scaling the first soft decode information is obtained from the successfully decoded codewords read from a same memory stripe.

17. The memory system of claim 11, wherein the soft decode information comprises log likelihood ratios estimating corrections for the failed codewords.

18. The memory system of claim 17, wherein the soft decode information comprises scaling factors applied to the log likelihood ratios by the adders.

19. The memory system of claim 18, wherein the scaling factors vary depending on a number of failures detected in a failed codeword being corrected.

20. The memory system of claim 11, wherein the memory controller comprises a low density parity matrix encoder and a low density parity matrix decoder for encoding and decoding user data respectively stored or retrieved from the memory block.

* * * * *